United States Patent [19]

Rath et al.

[11] 4,067,418
[45] Jan. 10, 1978

[54] NOISE REDUCING ASSEMBLIES FOR DISC BRAKES FOR VEHICLES

[75] Inventors: Heinrich Bernhard Rath, Vallendar (Rhine); Hans Georg Madzgalla; Sigma Micke, both of Koblenz, all of Germany

[73] Assignee: Girling Limited, Birmingham, England

[21] Appl. No.: 709,219

[22] Filed: July 27, 1976

[30] Foreign Application Priority Data

July 31, 1975 United Kingdom .............. 31973/75

[51] Int. Cl.² ........................................... F16D 65/04
[52] U.S. Cl. .................................. 188/72.4; 188/73.4; 188/73.5
[58] Field of Search ...................... 188/72.1, 72.4, 73.3, 188/73.4, 73.5, 73.6, 205 A, 362, 370

[56] References Cited

U.S. PATENT DOCUMENTS

| 3,166,158 | 1/1965 | Burnett et al. | 188/73.4 |
| 3,421,602 | 1/1969 | Craske | 188/73.4 |
| 3,616,875 | 11/1971 | Lottridge | 188/73.4 X |
| 3,913,709 | 10/1975 | Burgdorf et al. | 188/73.4 |

Primary Examiner—Stephen G. Kunin
Assistant Examiner—Douglas C. Butler
Attorney, Agent, or Firm—Scrivener, Parker, Scrivener & Clarke

[57] ABSTRACT

In a disc brake of the sliding yoke reaction type the noise due to "squeal" or "twitter" is substantially eliminated by resiliently biassing the yoke in grooves in a stationary member so that it engages an upper face of a groove on one side of the brake and a lower face of a groove on the other side. A dampening assembly may be provided between the yoke and a complementary face of one of the grooves. Alternatively the noise may be reduced by providing an abutment of stepped outline on the yoke which engages a friction pad assembly to apply it to the disc when the brake is applied.

12 Claims, 9 Drawing Figures

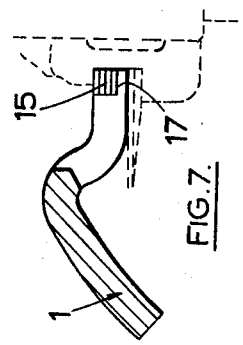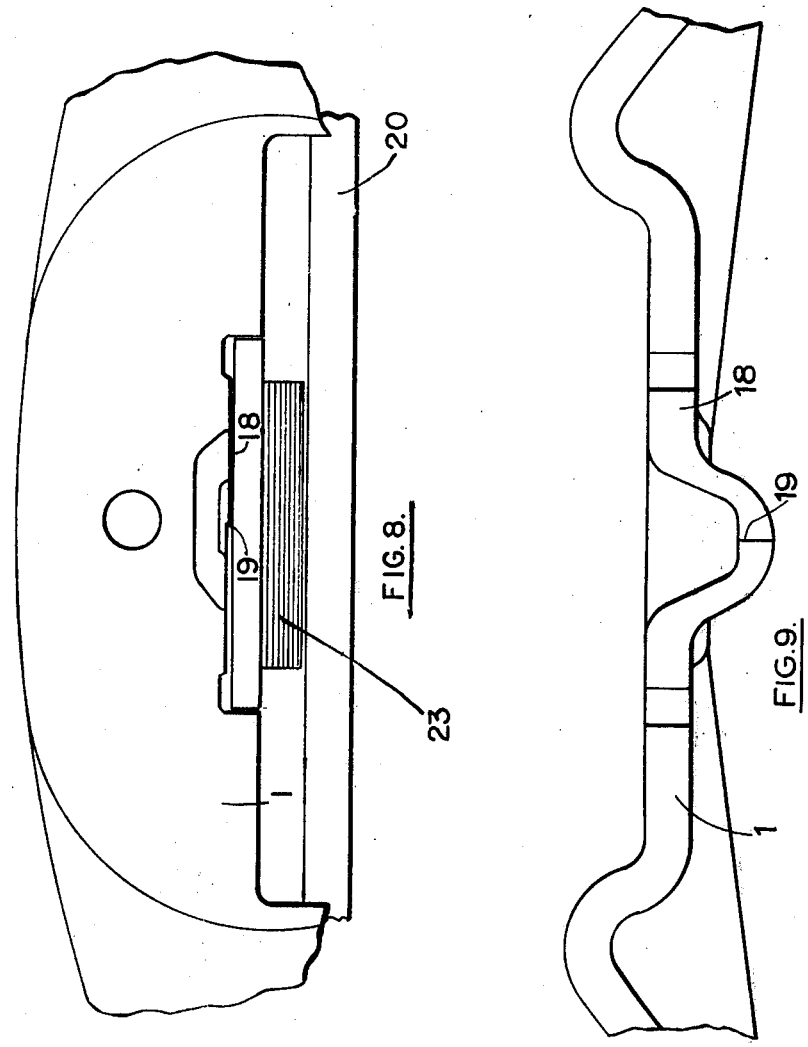

NOISE REDUCING ASSEMBLIES FOR DISC BRAKES FOR VEHICLES

SPECIFIC DESCRIPTION

This invention relates to disc brakes for vehicles of the kind in which friction pad assemblies are adapted to be applied to opposite faces of a rotatable disc.

Disc brakes of the kind set forth in general are sometimes noisy, both when the brake is applied and when the brake is in an "off" position. The noise is usually caused by "squeal" or "twitter".

Squeal may be defined as a high pitched noise associated only with the brake being applied. Squeal is usually at a resonant frequency of the disc and it is believed that it occurs when some part of the associated structures can vibrate at that frequency to excite the disc so that the disc acts as a sounding board. Of course there are several possible frequencies and harmonies dependent upon the mode of vibration of the disc. Squeal can be substantially prevented in a number of ways. For example, by altering the natural frequency of the disc and its mountings by altering the frequency of the structure which acts to excite the disc, by dampening the disc, and by dampening the structure which acts to excite the disc so preventing energy of vibration to be passed therefrom to the disc.

When a brake of the kind set forth is of the sliding yoke reaction type it is thought possible that the yoke, rather than the disc, acts as a sounding board. In such a brake the yoke is in the form of a relatively thin plate which extends over the peripheral edge of the disc and is guided for movement in a direction parallel to the axis of the disc in axially extending grooves on a stationary member on one side of the disc, the grooves each comprising upper and lower spaced parallel faces and an inner face normal to said upper and lower faces, and one of the friction pad assemblies is applied directly to the face of the disc adjacent to the stationary member by actuating means, the other friction pad assembly being mounted in the yoke and being applied to the opposite face of the disc indirectly by the reaction on the yoke of the actuating means. Such a brake will hereinafter be referred to as a "brake of the sliding yoke reaction type defined herein".

Another more likely possibility is that in a brake of the sliding yoke reaction type defined herein the yoke acts as an intermediate sounding board acting to amplify the vibration of the pad assemblies, thereby exciting the disc.

Twitter may be defined as an intermittent noise associated mainly with a brake "off" condition, which may be at disc frequency. Twitter often is evocatively described as "wire bushing", "squelch", or "graunch". Twitter is caused when a pad assembly runs very close to, or occasionally touches, the disc. This may be due to disc run-out in turn due to faulty manufacture, or worn bearings, or may arise during heavy cornering. Also twitter can be caused by a friction pad assembly "falling against" the disc and then bouncing off to generate noise. Twitter can be caused by positively urging the pad assemblies away from the disc by the use of springs. Whilst it is common practice to use pull-off springs for retracting the shoes of an internal shoe-drum brake, nevertheless this is inconvenient to achieve in disc brakes of the kind set forth. Loading the friction pad assemblies lightly against the disc is also effective in curing twitter but it is essential to bias the assemblies to one corner or edge, since light pressure line contact is much less likely to be noisy than light pressure full contact.

Both types of noise seem to be affected by lining or friction pad dust since the noises cease temporarily when the pad assemblies are replaced in the brake after they have been removed and brushed clean.

It is the object of our invention to improve the construction of a disc brake of the kind set forth in order to reduce or substantially eliminate the generation of noise by squeal and/or twitter.

According to one aspect of our invention in a disc brake of the sliding yoke reaction type as defined herein the yoke is resiliently biassed at one edge against the upper face of one of the grooves and at the other edge against the lower face of the other groove.

This alters the frequency of vibration of the yoke when the brake is applied.

This may be achieved by providing asymmetrically positioned grooves on the stationary member. The yoke may then be biassed at one edge against the upper face of one of the grooves and at the other edge against the lower face of the other groove. Thus the leading edge of the yoke may be biassed against the upper face of one of the grooves and the trailing edge against the lower face of the other groove, or vice versa.

Alternatively the grooves may be symmetrically positioned on the stationary member and the yoke biassed on each side by retaining springs so that one of its edges abuts the upper face of one of the grooves and its other edge abuts the lower face of the other groove. Thus the leading edge of the yoke may be biassed against the upper face of one of the grooves and the trailing edge against the lower face of the other groove, or vice versa.

The above constructions substantially eliminate the tendency of the yoke to dip at its trailing end when the brakes are applied heavily. Thus vibration and noise due to dipping of the yoke is prevented as the yoke is always supported in both grooves. If the yoke tends to dip in the other direction, at its leading end, due to the centre of pressure of the pad material being below the brake centre line, the biassing of the yoke is reversed.

According to another aspect of our invention in a disc brake of the sliding yoke reaction type as defined herein, dampening means, for example shims, may be positioned between the yoke and a complementary face of a groove on at least one side. The dampening means may be accommodated in recesses provided either in the yoke or in a complementary face of at least one of the grooves. Dampening means may also be accommodated thus in the first two embodiments where the line joining the mid-point in the depth of the inner faces of the grooves is inclined relative to the plane of the yoke.

In another brake construction for reducing squeal an abutment between the yoke and the friction pad assembly which it applies to the disc is of stepped outline. This generates an offset force which makes the trailing end of the pad touch the disc first when the brakes are applied.

Some embodiments of our invention will now be described by way of example with reference to the accompanying drawings, in which:

FIG. 7 is detail of the yoke showing a modification;

FIGS. 8 and 9 are respectively plan and end elevations of a portion of a modified yoke.

Figure 1:
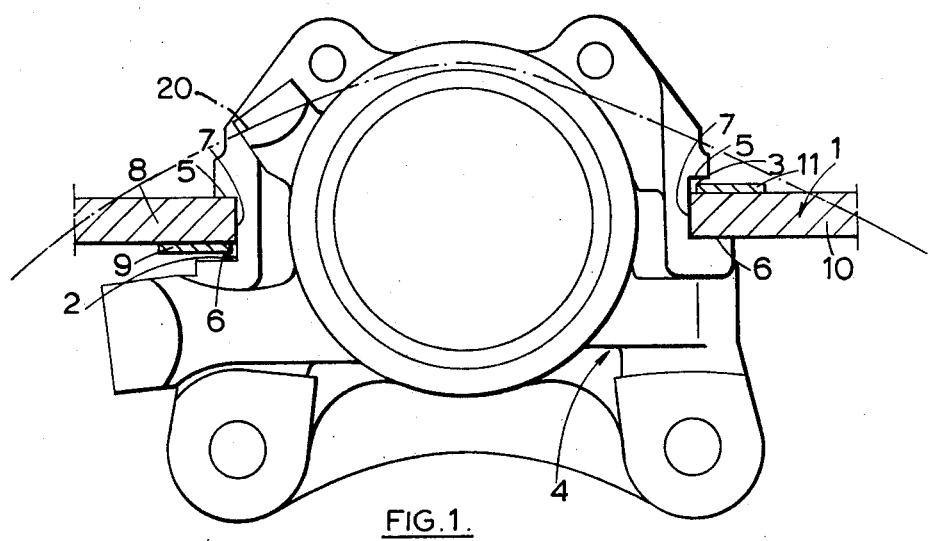
FIG. 1 is a transverse section through a disc brake of the sliding yoke reaction type.

FIG. 1 illustrates a disc brake of the sliding yoke reaction type in which a yoke 1 comprises a thin plate which extends over the peripheral edge of a rotatable disc indicated generally at 20 and is guided for movement in grooves 2,3 on each side of a stationary member 4 which is positioned on one side of the disc.

The grooves each comprise upper and lower spaced parallel faces 5, 6 and an inner face 7 normal to the parallel faces and joining them along adjacent longitudinal edges. The grooves 2, 3 are asymmetrically positioned on the stationary member. The leading edge 8 of the yoke 1 is biassed by means of a retaining spring 9 into engagement with the upper face 5 of the groove 2. The trailing edge 10 is biassed by means of a retaining spring 11 into engagement with the lower face 6 of the groove 3. This alters the modes of vibration of the yoke and noise is substantially eliminated.

Figure 2:
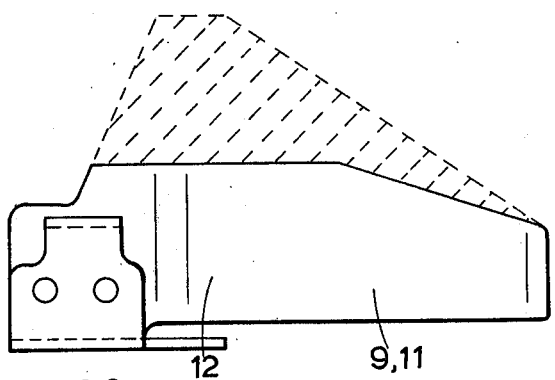
FIG. 2 is a side elevation of a bias spring for the yoke of the brake of FIG. 1.
Figure 3:
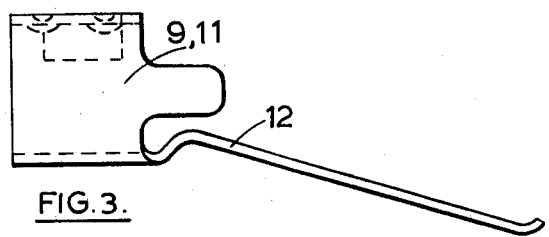
FIG. 3 is an end elevation of the same.

The yoke biassing springs 9,11 are of the strip type, modified as shown in FIGS. 2 and 3 to enable them to be fitted. A tongue 12 is provided for insertion between the yoke 1 and a groove.

Figure 4:
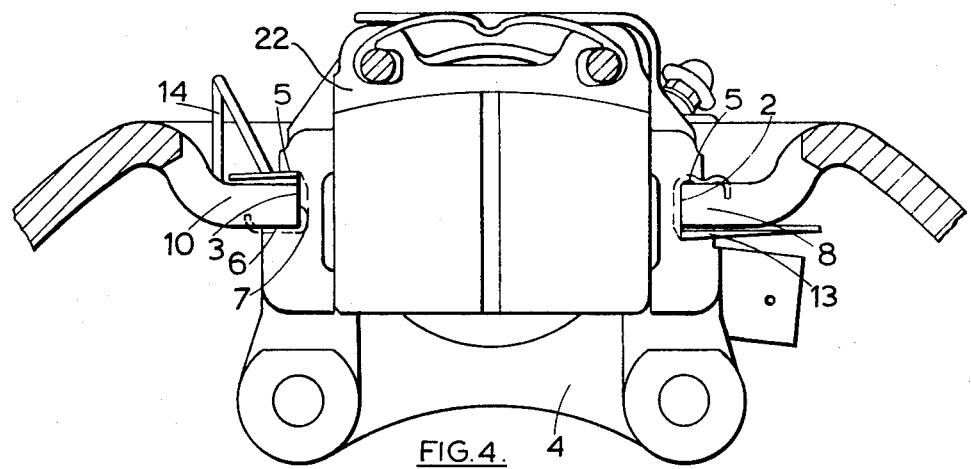
FIG. 4 is a section similar to FIG. 1 of a modified brake.

FIG. 4 illustrates a disc brake of the sliding yoke reaction type in which the grooves 2, 3 are symmetrically positioned on the stationary member 4. The yoke 1 is biassed at its leading edge 8 into engagement with the upper face 5 of the groove 2 by means of a retaining spring 13. The trailing edge 10 is biassed by retaining spring 14 into engagement with the lower face 6 of the groove 3. The retaining springs 13, 14 both comprise wire springs of skeletal outline.

Figure 5:
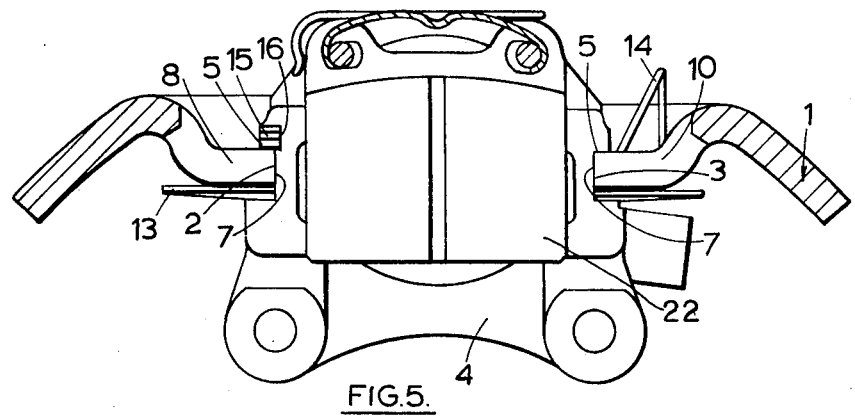
FIG. 5 is a section similar to FIG. 1 of a further modified brake.
Figure 6:
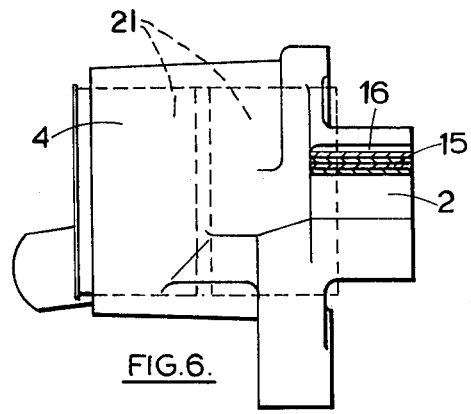
FIG. 6 is an elevation of one side of the stationary member of the brake of FIG. 5.

In the embodiments shown in FIGS. 1 and 4 or in any disc brake of the sliding yoke reaction type as defined herein, dampening means may be positioned between the yoke 1 and a complementary face of a groove on one or both sides. Actuating means are mounted in the stationary member 4 as indicated generally at 21 in FIG. 6 and act to apply a first friction pad assembly 22 directly to an adjacent face of the disc 20. FIGS. 5 and 6 show a modification of a disc brake of the sliding yoke reaction type in which dampening means are provided. The dampening means comprises a plurality of dampening shims 15 positioned in a recess 16 provided in the upper face 5 of the groove 2.

In an alternative illustrated in FIG. 7 the shims 15 are positioned in a recess 17 provided in the yoke 1. The shims can be provided at both leading and the trailing end of the yoke.

The shims 15 may all be of the same material or they may be of a mixture of materials, for example metal and plastics. They may comprise a soft metal, such as copper, or copper covered asbestos or alternatively they may be aluminium foil embedded in resin.

In the embodiment illustrated in FIGS. 8 and 9 an abutment region 18 on the yoke 1 for engagement with an indirectly applied friction pad assembly 23 is stepped at 19. This generates an offset force and urges the trailing edge of the pad to touch the disc 20 first when the brakes are applied. The tendency of the pad to "dig-in" at its leading edge due to the couple caused by having the drag reacting back plate spaced from the disc is thus counteracted.

We claim:

1. A disc brake for vehicles of the sliding yoke reaction type comprising a rotatable disc, friction pad assemblies adapted to be applied to opposite faces of said rotatable disc, a yoke in the form of a relatively thin plate extending over the peripheral edge of said disc, a stationary member on one side of the disc, said stationary member having axially extending grooves along opposite sides thereof, said grooves extending in a direction substantially parallel to the axis of said disc, each of said grooves comprising upper and lower spaced parallel faces and an inner face normal to said parallel faces, said yoke being guided in said grooves for movement in a direction parallel to the axis of said disc, actuating means for applying one of said pad assemblies directly to the face of said disc adjacent to said stationary member, the other of said friction pad assemblies being mounted in said yoke and being applied to the opposite face of said disc indirectly by the reaction on said yoke of said actuating means, said grooves defining abutment for limiting movement of said yoke with respect to said stationary member in a radial direction and resilient means biassing said yoke against the upper face of one of said grooves and against the lower face of the other of said grooves.

2. A disc brake as claimed in claim 1, wherein said grooves are asymmetrically positioned on said stationary member.

3. A disc brake as claimed in claim 2, wherein said yoke comprises leading and trailing edges, said resilient means biassing said leading and trailing edges in opposite directions, one of said edges being biassed into engagement with the upper face of one of said grooves and the other of said edges being biassed into engagement with the lower face of the other of said grooves.

4. A disc brake, as claimed in claim 1, wherein said grooves are symmetrically positioned on said stationary member and said resilient means comprises wire springs of skeletal outline which bias said yoke at its leading edge into engagement with the upper face of one of said grooves and at its trailing edge into engagement with the lower face of the other of said grooves.

5. A disc brake as claimed in claim 1, wherein dampening means are interposed between the yoke and a complementary face of a groove on at least one side of said stationary member.

6. A disc brake as claimed in claim 5, wherein said dampening means comprise a plurality of dampening shims.

7. A disc brake as claimed in claim 5, wherein said yoke is provided with a recess at at least one of its edges, said dampening means being positioned in said recess.

8. A disc brake as claimed in claim 5, wherein the upper face of at least one of said grooves is provided with a recess, said dampening means being positioned in said recess.

9. A disc brake as claimed in claim 5, wherein said dampening means comprise a plurality of dampening shims.

10. A disc brake as claimed in claim 5, wherein said yoke is provided with a recess at at least one of its edges, said dampening means being positioned in said recess.

11. A disc brake as claimed in claim 5, wherein the upper face of at least one of said grooves is provided with a recess, said dampening means being positioned in said recess.

12. A disc brake for vehicles of the sliding yoke reaction type comprising a rotatable disc, friction pad assemblies adapted to be applied to opposite faces of said rotatable disc, a yoke in the form of a relatively thin plate extending over the peripheral edge of said disc, a stationary member on one side of the disc provided with guide means said yoke being guided by said guide means for movement in a direction parallel to the axis of said disc, actuating means for applying one of said pad assemblies directly to the face of said disc adjacent to said stationary member, the other of said friction pad assemblies being mounted in said yoke and being applied to the opposite face of said disc indirectly by the reaction on said yoke of said actuating means, resilient means biassing said yoke against the upper face of one of said grooves and against the lower face of the other of said grooves, and an abutment of stepped outline between the yoke and the indirectly applied friction pad assembly.

* * * * *